No. 787,867. PATENTED APR. 18, 1905.
C. W. VAN WYE.
SIEVE FOR THRESHING MACHINES.
APPLICATION FILED AUG. 3, 1904.

2 SHEETS—SHEET 1.

Witnesses
Inventor
C. W. Van Wye
By
Chandlee Chandlee
Attorneys

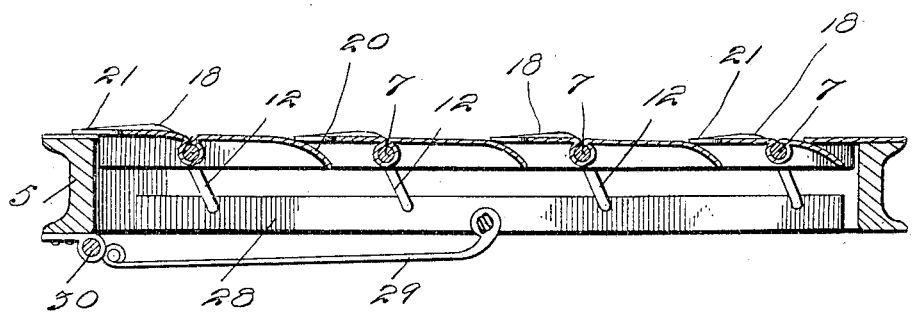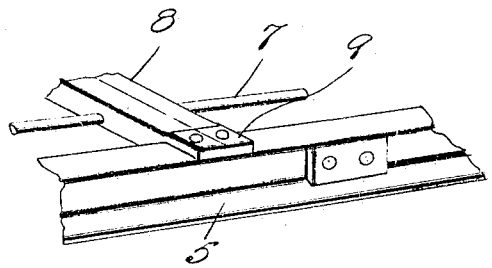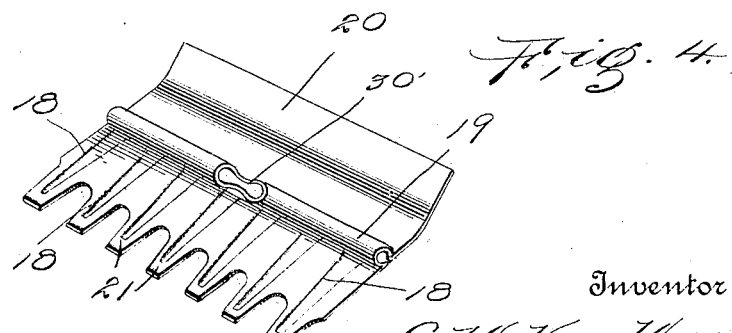

No. 787,867.  
Patented April 18, 1905.

UNITED STATES PATENT OFFICE.

CHARLES W. VAN WYE, OF FREEPORT, KANSAS.

SIEVE FOR THRESHING-MACHINES.

SPECIFICATION forming part of Letters Patent No. 787,867, dated April 18, 1905.

Application filed August 3, 1904. Serial No. 219,351.

*To all whom it may concern:*

Be it known that I, CHARLES W. VAN WYE, a citizen of the United States, residing at Freeport, in the county of Harper, State of Kansas, have invented certain new and useful Improvements in Sieves for Threshing-Machines; and I do hereby declare the following to be a full, clear, and exact description of the invention, such as will enable others skilled in the art to which it appertains to make and use the same.

This invention relates to sieves for threshing-machines, and more particularly to the class of adjustable sieves, the object of the invention being to provide a sieve wherein there will be a minimum of obstruction to the passage of grain and other matter over the sieve and in which the slats may be readily adjusted to correspond to different grains to be treated.

A further object of the invention is to provide a sieve including a light frame of cheap and durable structure and to provide a form of slat which will be rigid, which may be made at a low cost, and which will be efficient in its operation.

Other objects and advantages of the invention will be understood from the following description.

Figure 1:
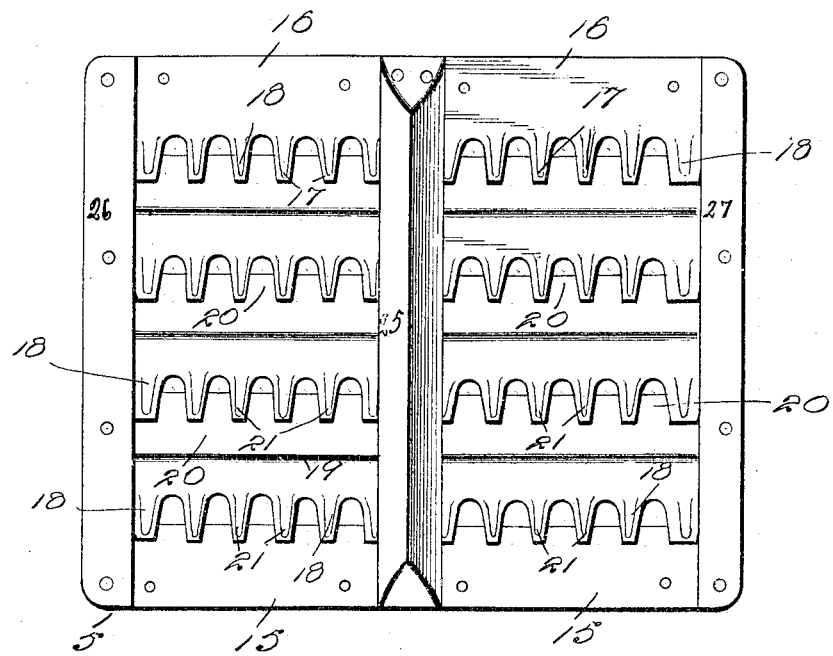
Figure 2:
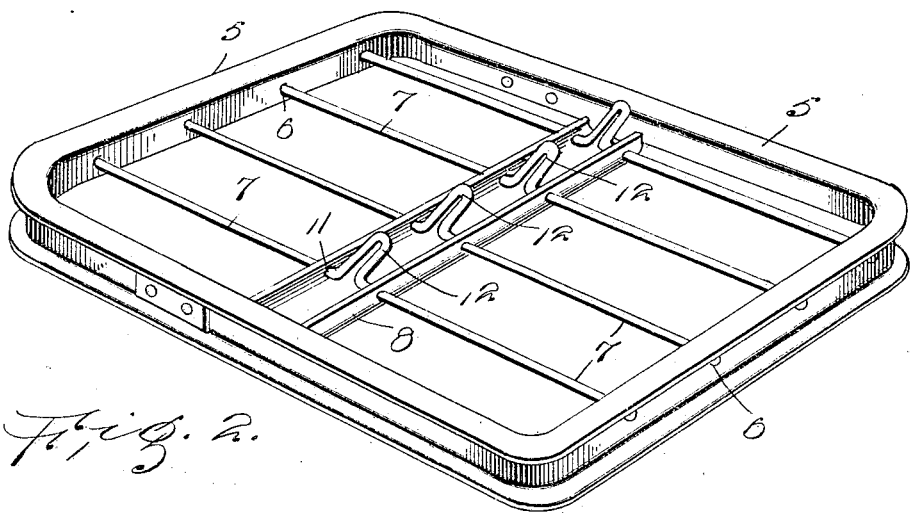

In the drawings forming a portion of this specification, and in which like numerals of reference indicate similar parts in the several views, Figure 1 is a top plan view showing a sieve embodying the present invention. Fig. 2 is a perspective view of the frame of the sieve. Fig. 3 is a vertical section taken longitudinally through the sieve. Fig. 4 is a detail perspective view of one of the slats. Fig. 5 is a detail view showing a portion of the structure in perspective.

Referring now to the drawings, there is shown a sieve comprising a frame formed of a section of channel-iron bent into rectangular shape, with the channel disposed outwardly, the ends of the frame being provided with perforations 6, which receive rods 7, that extend longitudinally of the frame and carry the slats. Transversely of the upper side of the frame 5, midway between the ends thereof, there is disposed a brace 8, consisting of a piece of channel-iron disposed with its channel downwardly, the sides of the channel being cut away at the ends of the iron to form the end fingers 9 and 10, which rest upon the upper edge of the frame 5 and are secured thereto by riveting or in any other suitable manner. Through the sides of the channel-iron brace 8 are formed perforations 11, in which the rods 7 are received, each rod between the sides of the channel of the brace being kinked to form a crank-arm 12 for oscillating the rod.

Upon the ends of the frame 5 are secured plates 15 and 16, of which the latter is provided with fingers 17, tapered in the directions of their free ends and having each a central longitudinal corrugation 18, which extends a slight distance into the plate 16 and serves not only to stiffen the finger, but also rounds it transversely, so that it is higher in the middle than at its side edges. The fingers 17 project over the inclosure of the frame 5. Upon each of the rods 7, at each side of the brace 8, there is arranged a slat consisting of a sheet of metal which is bent upon itself to form a cylindrical loop 19, which snugly receives the rod, the metal of the plate at both sides of the loop being bent sharply in the opposite direction, so as to lie in a common plane, the metal at the sides of the loop being in contact at the loop, so as to present a substantially unbroken surface. The metal of each slat at that side of the loop next the plate 16 is continued flat for a short distance and is then curved downwardly into the frame to form a deflector 20. The metal at the opposite side of the loop is continued straight and its free edge is cut to form fingers 21, which are corrugated longitudinally. The corrugations of the fingers 21 are extended beyond the bases of the fingers, and these fingers extend over and beyond the downwardly-curved portions of the adjacent plates. The fingers of the slats at one end of the sieve overlap the plates 15.

As illustrated, there is a series of slats at each side of the channel-brace 8, and upon the channel-brace is secured a cross-sectionally-triangular comb or shed 25, guard-rails 26 and 27 being secured upon the sides of the frame 5 at opposite ends of the slats.

The crank-arms of the several rods 8 are pivotally engaged with a connecting rod or plate 28, to which is pivoted a link 29, pivoted in turn to a shaft 30, having means for oscillating. As the rock-shaft is swung in one direction or the other the slats are shifted, so as to give a greater or lesser separation of the fingers of one slat from the rear portion of the next slat, so that the sieve may be adjusted for use with different grains.

In the tubular loops of the slats are formed openings 30', which facilitate the introduction of solder to secure the slats to the rods 7.

It will be understood that in practice modifications of the specific construction shown may be made, and any suitable materials and proportions may be used for the various parts without departing from the spirit of the invention.

What is claimed is—

1. A sieve comprising a frame, a series of rods journaled in the frame, means for rocking the rods and a slat secured to each of the rods, each of the slats consisting of a plate bent near its center into a tube on a line approximately parallel with its side edges, the tube extending from end to end of the plate and lying wholly at one side of the plate and encircling the rod.

2. A slat for sieves consisting of a plate bent near its center into a tube on a line approximately parallel with its side edges, the tube extending from end to end of the plate and lying wholly at one side of said plate, and a supporting-rod encircled by the tube.

In testimony whereof I affix my signature in presence of two witnesses.

CHARLES W. VAN WYE.

Witnesses:
   GEO. L. PIPER,
   J. A. HAZLE.